(12) United States Patent
Tumuluru et al.

(10) Patent No.: US 10,666,729 B2
(45) Date of Patent: May 26, 2020

(54) STEERING NETWORK FLOWS AWAY FROM CONGESTION AND HIGH LATENCY HOTSPOTS

(71) Applicant: VMware, Inc., Palo Alto, CA (US)

(72) Inventors: Laxminarayana Tumuluru, Fremont, CA (US); Todd Sabin, Morganville, NJ (US); Weiqing Wu, Cupertino, CA (US); Uday Masurekar, Sunnyvale, CA (US); Serge Maskalik, Los Gatos, CA (US); Sachin Thakkar, San Jose, CA (US); Debashis Basak, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 15/654,588

(22) Filed: Jul. 19, 2017

(65) Prior Publication Data

US 2018/0063743 A1 Mar. 1, 2018

Related U.S. Application Data

(60) Provisional application No. 62/380,993, filed on Aug. 29, 2016.

(51) Int. Cl.
*H04L 12/56* (2006.01)
*H04L 29/08* (2006.01)
(Continued)

(52) U.S. Cl.
CPC .......... *H04L 67/1097* (2013.01); *G06F 8/65* (2013.01); *G06F 9/5027* (2013.01); *G06F 9/5044* (2013.01); *G06F 9/5061* (2013.01); *G06F 9/5077* (2013.01); *H04L 12/4633* (2013.01); *H04L 41/082* (2013.01); *H04L 41/0803* (2013.01); *H04L 43/103* (2013.01); *H04L 45/72* (2013.01); *H04L 47/12* (2013.01); *H04L 47/825* (2013.01); *H04L 49/354* (2013.01);
(Continued)

(58) Field of Classification Search
CPC ....... H04L 45/24; H04L 47/125; H04L 47/12; H04L 45/04; H04L 45/123; H04L 45/00; H04L 45/02; H04L 45/22; H04L 45/48; H04L 41/12; H04L 47/10
See application file for complete search history.

(56) References Cited

U.S. PATENT DOCUMENTS

| | | |
|---|---|---|
| 2003/0088421 A1 | 5/2003 | Maes et al. |
| 2003/0191834 A1 | 10/2003 | Steegmans |
| 2004/0081091 A1 | 4/2004 | Widmer et al. |
| 2007/0109966 A1* | 5/2007 | Lee ................... H04L 12/4633 370/231 |
| 2007/0280243 A1 | 12/2007 | Wray et al. |

(Continued)

*Primary Examiner* — Sai Aung
(74) *Attorney, Agent, or Firm* — Patterson + Sheridan, LLP

(57) ABSTRACT

An approach is disclosed for steering network traffic away from congestion hot-spots to achieve better throughput and latency. In one embodiment, multiple Foo-over-UDP (FOU) tunnels, each having a distinct source port, are created between two endpoints. As a result of the distinct source ports, routers that compute hashes of packet fields in order to distribute traffic flows across network paths will compute distinct hash values for the FOU tunnels that may be associated with different paths. Probes are scheduled to measure network metrics, such as latency and liveliness, of each of the FOU tunnels. In turn, the network metrics are used to select particular FOU tunnel(s) to send traffic over so as to avoid congestion and high-latency hotspots in the network.

18 Claims, 3 Drawing Sheets

(51) Int. Cl.
*H04L 29/12* (2006.01)
*H04L 29/06* (2006.01)
*G06F 8/65* (2018.01)
*H04L 12/24* (2006.01)
*G06F 9/50* (2006.01)
*H04L 12/801* (2013.01)
*H04L 12/911* (2013.01)
*H04W 28/02* (2009.01)
*H04L 12/931* (2013.01)
*H04L 12/46* (2006.01)
*H04L 12/26* (2006.01)
*H04L 12/721* (2013.01)
*H04L 12/715* (2013.01)
*H04L 12/725* (2013.01)
*G06F 9/455* (2018.01)

(52) U.S. Cl.
CPC .......... *H04L 49/70* (2013.01); *H04L 61/2007* (2013.01); *H04L 61/2592* (2013.01); *H04L 63/029* (2013.01); *H04L 63/0272* (2013.01); *H04L 67/10* (2013.01); *H04L 69/16* (2013.01); *H04L 69/22* (2013.01); *H04L 69/324* (2013.01); *H04W 28/0273* (2013.01); *H04W 28/0289* (2013.01); *G06F 2009/4557* (2013.01); *H04L 45/04* (2013.01); *H04L 45/302* (2013.01); *H04L 47/10* (2013.01); *H04L 61/2061* (2013.01); *H04L 61/6022* (2013.01); *H04W 28/02* (2013.01); *H04W 28/0284* (2013.01)

(56) References Cited

U.S. PATENT DOCUMENTS

| | | |
|---|---|---|
| 2008/0031149 A1* | 2/2008 | Hughes ............... H04L 43/0894 370/252 |
| 2008/0138067 A1 | 6/2008 | Beshai |
| 2011/0044438 A1 | 2/2011 | Wang et al. |
| 2013/0016612 A1* | 1/2013 | Vasseur ................ H04L 45/48 370/235 |
| 2013/0044764 A1 | 2/2013 | Casado et al. |
| 2013/0070654 A1* | 3/2013 | Nishimura ........... H04W 40/12 370/310 |
| 2013/0083701 A1 | 4/2013 | Tomic et al. |
| 2013/0128786 A1 | 5/2013 | Sultan et al. |
| 2013/0263125 A1 | 10/2013 | Shamsee et al. |
| 2013/0305311 A1 | 11/2013 | Puttaswamy Naga et al. |
| 2014/0105015 A1 | 4/2014 | Hui et al. |
| 2014/0108722 A1 | 4/2014 | Lipchuk et al. |
| 2014/0133302 A1* | 5/2014 | Fu ........................ H04L 45/125 370/231 |
| 2014/0320500 A1 | 10/2014 | Fletcher et al. |
| 2015/0249565 A1 | 9/2015 | Yamabe et al. |
| 2015/0281078 A1 | 10/2015 | Luo et al. |
| 2016/0094364 A1 | 3/2016 | Subramaniyam et al. |
| 2016/0182379 A1* | 6/2016 | Mehra .................. H04L 47/125 709/223 |
| 2016/0182380 A1* | 6/2016 | Mehra .................. H04L 47/125 |
| 2016/0349993 A1 | 12/2016 | Udupi et al. |
| 2017/0093754 A1 | 3/2017 | Zhang et al. |
| 2017/0257309 A1 | 9/2017 | Appanna |
| 2018/0006935 A1 | 1/2018 | Mutnuru et al. |
| 2018/0062875 A1 | 3/2018 | Tumuluru |
| 2018/0062920 A1 | 3/2018 | Srinivasan et al. |
| 2018/0063074 A1 | 3/2018 | Shankarappa et al. |
| 2018/0069924 A1 | 3/2018 | Tumuluru et al. |

* cited by examiner

STEERING NETWORK FLOWS AWAY FROM CONGESTION AND HIGH LATENCY HOTSPOTS

CROSS-REFERENCE TO RELATED APPLICATIONS

This application claims benefit of U.S. Provisional Patent Application No. 62/380,993, filed Aug. 29, 2016, which is incorporated herein by reference in its entirety.

BACKGROUND

Network latency and throughput of traffic traversing a network are determined by various factors including the number of hops between the source and the destination, congestion in a network path between the source and the destination, branching in the network path, service provider service level agreements, and peering relationships between service providers, among others. In particular, branching in the network path can result from equal cost multi-paths (ECMPs) and link aggregation. Such branching is typically state-less and based on a hash of packets fields, with packets being sent over particular network paths according to the hash of the packet fields. However, this state-less branching of traffic can cause hot spots in some branches leading to congestion and high latency.

SUMMARY

One embodiment provides a computer-implemented method of avoiding congestion and high latency in a network. The method generally includes creating a plurality of tunnels routed across distinct network paths between two endpoints. The method further includes determining one or more performance metrics for each of the plurality of tunnels. In addition, the method includes directing network traffic through one of the tunnels based on the determined performance metrics.

Further embodiments provide a non-transitory computer-readable medium that includes instructions that, when executed, enable a computer to implement one or more aspects of the above method, and a computer system programmed to implement one or more aspects of the above method.

DETAILED DESCRIPTION

Embodiments disclosed herein relate to techniques for steering network traffic away from congestion hot-spots to achieve better throughput and latency. Foo-over-UDP (FOU) tunnels are used herein as an example of internet protocol (IP) tunnels through which network traffic may be sent, but it should be understood that techniques disclosed herein are also applicable to other types of tunnels. Tunneling encapsulates packets constructed in one protocol format within another protocol for transmission over a network, such that the packets that are encapsulated appear as data to the network. FOU in particular is a user datagram protocol (UDP) header encapsulation/tunneling mechanism. Any IP protocol can be encapsulated using FOU, and the FOU UDP encapsulation may provide advantages such as Network Overlay creation, hardware/software optimizations such as Receive Side Scaling (RSS) and Equal Cost Multipath (ECMP) routing, UDP checksum offload, etc. In one embodiment, multiple FOU tunnels are created between two endpoints, with each FOU tunnel having a distinct source port. As a result of the distinct source ports, routers that compute hashes of packet fields in order to distribute traffic flows across network paths will compute distinct hash values for each of the FOU tunnels that may be associated with different paths. Probes are then scheduled to measure network metrics, such as latency and liveliness, of each of the FOU tunnels, both periodically and in response to certain events. In turn, a load balancer uses the network metrics to select particular FOU tunnel(s) to send traffic through so as to avoid congestion and high-latency hotspots in the network.

Figure 1:
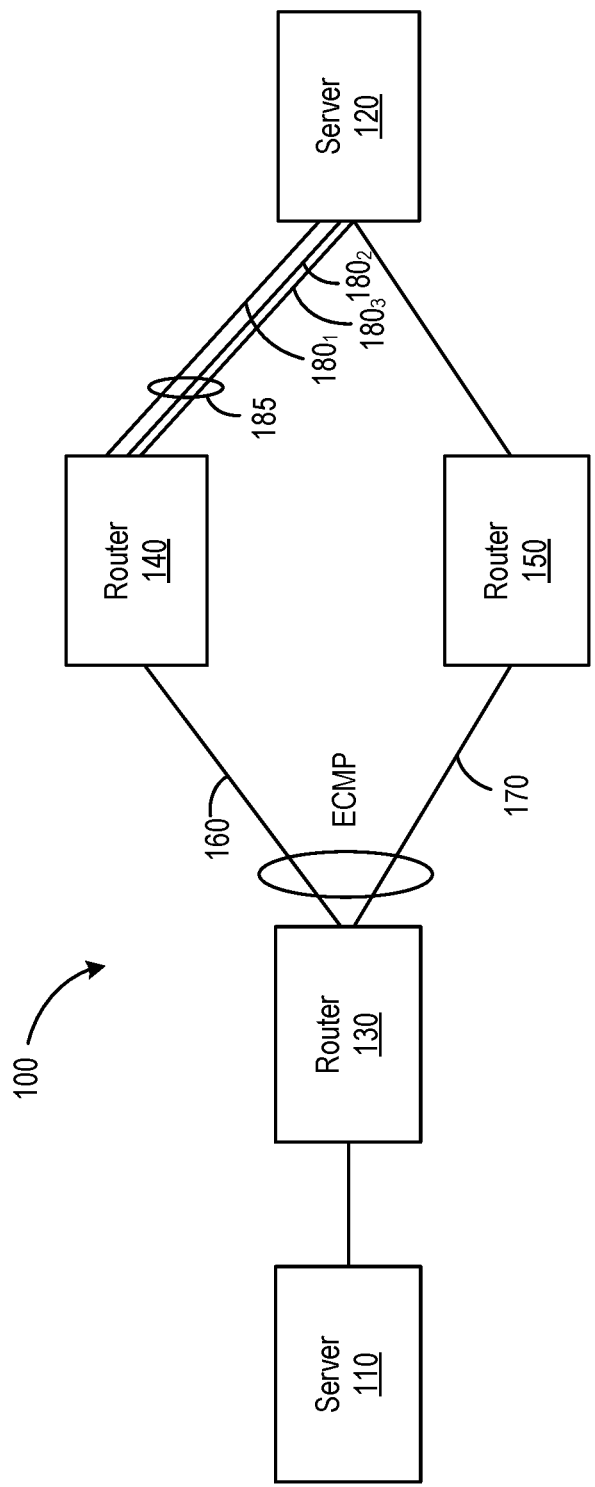
FIG. 1 is a block diagram of a computing system in which one or more embodiments may be implemented.

FIG. 1 is a block diagram of a computing system 100 in which one or more embodiments may be implemented. As shown, servers 110 and 120 are in communication over a network, and routers 130, 140, and 150 forward packets through the network. The network may generally be a wide area network (WAN), such as the Internet, or a local area network (LAN), such as a network within a data center with multiple routers. In one embodiment, servers 110 and 120 may be virtual appliances. Virtual appliances are pre-configured virtual machines (VMs) with software appliances installed therein. For example, servers 110 and 120 may be gateway virtual appliances in a hybrid cloud computing system, with one of the virtual appliance servers running in the cloud and the other virtual appliance server running in an on-premise data center. In such a case, clients in the cloud may connect to the server running in the data center, and clients in the data center may connect to the server running in the cloud, to communicate with each other. Alternatively, servers 110 and 120 may be physical servers. Although two servers 110 and 120 are shown, it should be understood that techniques disclosed herein may also be employed with more than two servers. Further, servers 110 and 120 are used herein as examples of endpoints, but it should be understood that techniques disclosed herein are also applicable to other types of endpoints, such as personal computers (PCs), smart phones, tablets, and the like.

As shown, two ECMP paths 160 and 170 between router 130 and routers 140 and 150, respectively, may be used to route packets from server 110 to server 120. ECMP is a routing strategy in which next-hop packet forwarding to a destination can occur over multiple "best paths" based on routing metric calculations. To balance traffic from server 110 to server 120 across paths 160 and 170, router 130 may compute a hash of certain fields of the packets it receives and distribute traffic flows to network links based on the hash values. For example, a common hash that routers compute is the five-tuple hash of a packet's source IP address, destination IP address, protocol, source port, and destination port. Each such five-tuple identifies a traffic flow, and router 130 distributes traffic flows across paths 160 and 170 based on the five-tuple hash.

Link aggregation, also referred to as link bundling, is another load balancing technique based on hashing mechanisms that routers may use. Link aggregation combines multiple network links into a single logical link in order to increase throughput and provide redundancy. Illustratively, three links $180_{1-3}$ between router 140 and server 120 are aggregated into a single logical link 185. If each of the three links $180_{1-3}$ has 1 gigabit bandwidth, then the single link 185 would have a 3 gigabit bandwidth.

In one embodiment, server 110 (and/or server 120) is configured to create multiple FOU tunnels between servers 110 and 120, through which packets may be sent. As discussed, FOU is a unidirectional IP-in-IP or generic routing encapsulation (GRE) tunnel with a user datagram protocol (UDP) header. FOU tunnels may be configured statically on both servers 110 and 120 to create the FOU tunnels. In a particular embodiment, FOU tunnels may be used to wrap Internet Protocol Security (IPSec) tunnels such that multiple IPSec tunnels go into each FOU tunnel at server 110 and come out at server 120 (or vice versa). Performance parallelism is gained by using the multiple IPSec tunnels. Each FOU tunnel provides bundling and abstraction of IPSec tunnels, requiring only one public IP address for the FOU tunnel on each side and permitting the IPSec tunnels to use private IP spaces.

It should be understood that the UDP source port of different connecting clients may differ, while the destination port of the server being connected to may generally stay the same. In one embodiment, server 110 creates multiple FOU tunnels between servers 110 and 120 with the same source IP address, destination IP address, and destination port, but different source ports. The source port of a FOU tunnel can be explicitly programmed when creating a FOU interface. For example, 64 or 128 FOU tunnels may be created, each with the same IP endpoints but a unique source port. As discussed, routers such as router 130 compute hashes of packet fields to distribute flows across ECMP paths. Assuming that a five-tuple hash of each packet's source IP address, destination IP address, protocol, source port, and destination port is computed, packets sent via the multiple FOU tunnels may hash to different paths as a result of the different source ports assigned to the FOU tunnels. For example, router 130 may hash values for packets sent via two FOU tunnels and distribute the packets of those FOU tunnels to paths 160 and 170, respectively, based on the computed hash values. It should be understood that the performance of some FOU tunnels may be better than others due to the path the FOU tunnels' traffic takes.

In one embodiment, a traffic monitor running in server 110 determines performance metric(s) for each of the FOU tunnels. Examples of such metrics include latency, liveliness, throughput, and packet loss. Server 110 then dynamically load balances traffic across the multiple FOU tunnels based on the metric(s) determined for the FOU tunnels. That is, server 110 picks a substantially optimal ECMP path associated with one of the FOU tunnels between servers 110 and 120 based on the measured performance of the FOU tunnels, and then encapsulates traffic (e.g., IPsec tunnels) with the picked FOU tunnel.

Figure 2:
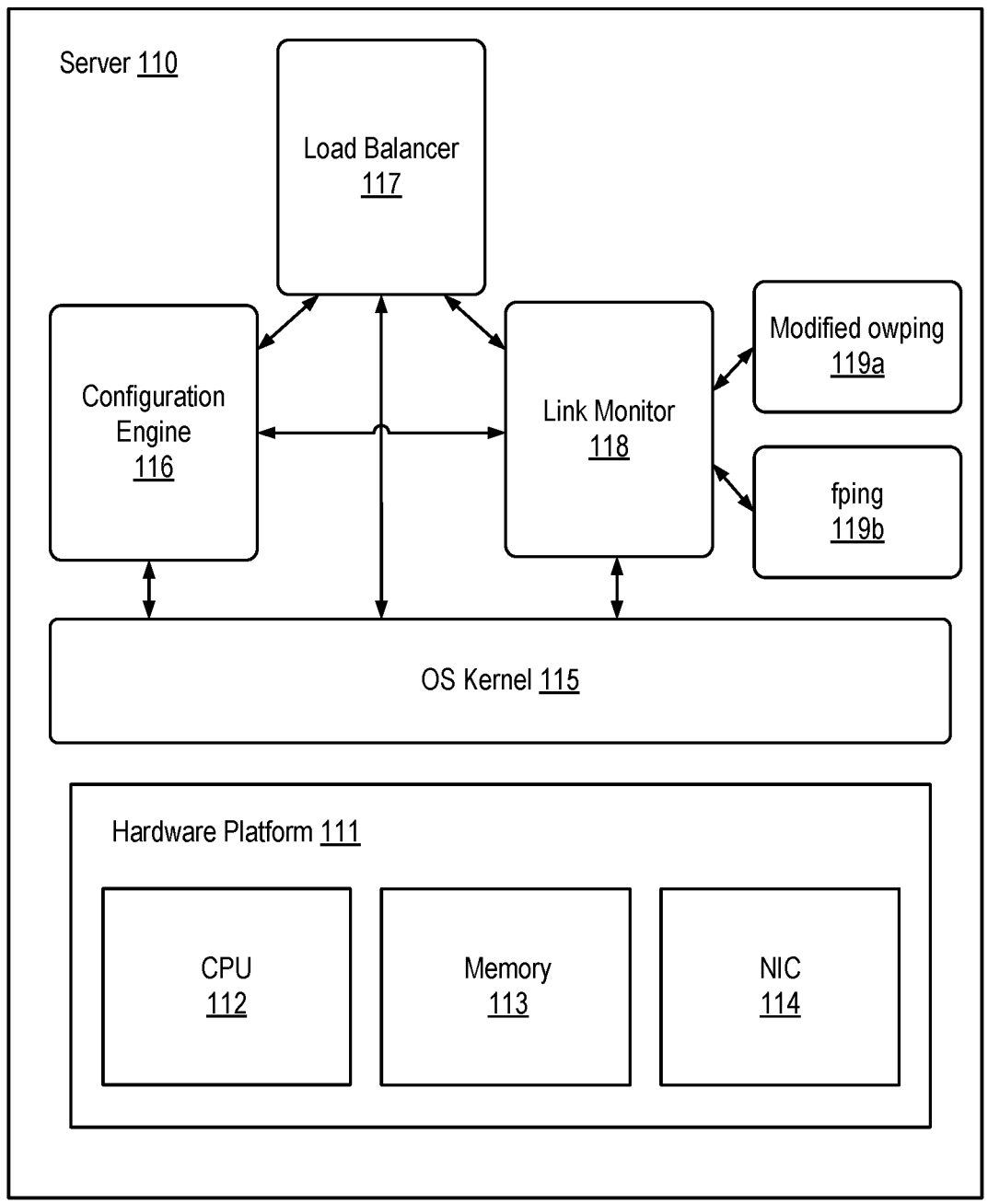
FIG. 2 illustrates in greater detail one of the servers of the computing system in FIG. 1, according to an embodiment.

FIG. 2 illustrates in greater detail server 110 of the computing system 100 shown in FIG. 1, according to an embodiment. Although a physical server 110 is shown, it should be understood that, in an alternative embodiment, one or both endpoints may be virtual appliances running in host computer systems. As shown, server 110 is constructed on a conventional hardware platform. Illustratively, hardware 111 of server 110 includes a central processing unit (CPU) 112 that retrieves and executes programming instructions stored in a memory 113 and also stores and retrieves application data residing in memory 113. Hardware 111 further includes a network interface controller (NIC) 114 connecting server 110 to a network, such as the Internet or a local area network (LAN). In addition, hardware 111 may also include an I/O device interface (not shown) connecting I/O devices (e.g., keyboard, display and mouse devices) to server 110.

As shown, an operating system (OS) kernel 115 runs in server 110, and configuration engine 116, load balancer 117, link monitor 118, modified one-way ping (owamp) 119a, and fping 119b applications run on OS kernel 115. For example, OS kernel 115 may be a Linux® kernel. In one embodiment, configuration engine 116 is responsible for configuring server 110 with all the necessary routing and rules to forward traffic, and configuration engine 116 may also configure and manage software-defined wide area network (SD-WAN) features. In particular, configuration engine 116 is configured to receive configuration information from a management application (not shown) and create multiple FOU tunnels, e.g. 64 or 128 tunnels, according to the configuration information. For example, the configuration information may be input by a user into the management application, and FOU tunnels may be configured statically based on the configuration information. For each FOU tunnel, configuration engine 116 may create an IP rule and route to reach an IP address of the remote side, as well as an IP rule and route to use the FOU tunnel for multiple (e.g., 5) IPSec tunnel IPs. In one embodiment, the configuration information used to create the FOU tunnels may include information specifying FOU tunnels with the same IP source address, IP destination address, and destination port, but different source ports. As discussed, packets sent through such FOU tunnels having different source ports may be routed along different paths as a result of five-tuple hashing performed by routers. Further, some of the FOU tunnels may be better than others due to the path the FOU tunnels' traffic takes.

Modified owamp and fping applications 119a and 119b send end-to-end pings from server 110 to server 120 through the multiple FOU tunnels to determine latency and liveliness of each of the tunnels, respectively, which can in turn be used to identify better FOU tunnels through which traffic should be sent. Owamp may also be used to authenticate the FOU tunnels, based on a probe response. Although owamp and fping are used herein as examples, it should be understood that other network measurements such as throughput, packet loss, latency drop, and the like may be used in addition to, or in lieu of, owamp and fping. Unlike traditional ping, owamp is unidirectional and generally requires two channels to be opened, a test channel over which unidirectional packets are sent and a bidirectional control channel over which latency information is collected. In one embodiment, owamp is modified to instead use relative latency of the FOU tunnels, rather than absolute latency, as discussed in greater detail below.

Link monitor 118 is configured to measure network metrics, such as latency and liveliness, for multiple FOU tunnels created by configuration engine 116 using, e.g., the modified owamp and fping applications 119a and 119b. If there are many FOU tunnels, probing the FOU tunnels may use a lot of processor and disk resources (in the case of owamp). In one embodiment, link monitor 118 reduces the strain on resources by scheduling monitoring to occur periodically, as well as in response to particular events, and not creating continuous probes for all the FOU tunnels. For example, link monitor 118 may schedule fping to run once every second or few seconds to check liveliness of the FOU tunnels, and link monitor 118 may schedule the modified owamp to run once every one or two minutes to measure latency of the FOU tunnels. These probe frequencies are based on the assumption that latency does not change as often as liveliness, and because fping uses ICMP packets while Owamp requires a control connection and uses UDP packets that encapsulate more information and is more expensive to run, typically taking a few seconds for each FOU tunnel. To help ensure fairness in probe scheduling, link monitor 118 may create a separate probe scheduler for each local-IP and remote-IP pair, thereby ensuring that probes of a slow WAN link are not blocking a faster link. The probe schedulers may also be triggered to run probes in parallel (e.g., 4 at a time). Further, different schedulers may be used for static FOU tunnels and dynamic FOU tunnels that are created in response to detecting network address translation (NAT). In addition, link monitor 118 may measure network metrics in response to events such as new network adapters being added or a configuration change, among other things.

In one embodiment, a modified owamp technique may be used to determine FOU tunnel latency. One-way probing using owamp traditionally requires time synchronization of server clocks, e.g., using network time protocol (NTP), to obtain an exact latency measurement. However, assuming server clocks are not synchronized, the modified owamp technique is still able to determine relative latencies of FOU tunnels, as the source and destination that the FOU tunnels originate and end in are the same. In the modified owamp technique, owamp application 119a first sends server 110's time to server 120 as an initial time synchronization. This time is stored in server 120 and used to determine latencies. Link monitor 118 then compares the latencies of the different FOU tunnels to determine relative latencies. For example, if the latency of one FOU tunnel is measured as 10 milliseconds and the latency of another FOU tunnel is measured as 100 milliseconds, then link monitor 118 may determine that the first FOU tunnel has the lower relative latency, even though 10 milliseconds and 100 milliseconds may not be the exact latencies which would require, e.g., NTP synchronization to obtain.

Load balancer 117 determines which FOU tunnel to send traffic through based on the network metrics obtained by link monitor 118 and implements policy-based routing by programming routing tables, such as the Linux® iptables mangle table, so that traffic flows are encapsulated using the determined FOU tunnel. In one embodiment, all Encapsulating Security Payload (ESP) and Internet Key Exchange (IKE) traffic will use the mangle table to mark packets with a firewall mark (fwmark) of the determined FOU tunnel, and the fwmark is further used in the Linux® ip rule table to derive the route table for forwarding the packets in to the determined FOU tunnel's interface. IKE traffic may then use the determined FOU tunnel to negotiate an IPSec tunnel.

Any feasible selection algorithm may be used to select the FOU tunnel to use. For example, load balancer 117 may select one of multiple FOU tunnels through which server 120 can be reached and that has the lowest latency, and load balancer 117 may then program routing tables to encapsulate a number of IPSec tunnels with the selected FOU tunnel. In one embodiment, load balancer 117 may give additional weighting to FOU tunnel(s) that are currently in use when determining which FOU tunnel to send traffic through. For example, a latency increase may be temporary, or the owamp measurement may be incorrect, and the additional weighting given to the currently used FOU tunnel(s) may help avoid switching to other FOU tunnel(s) unnecessarily.

Figure 3:
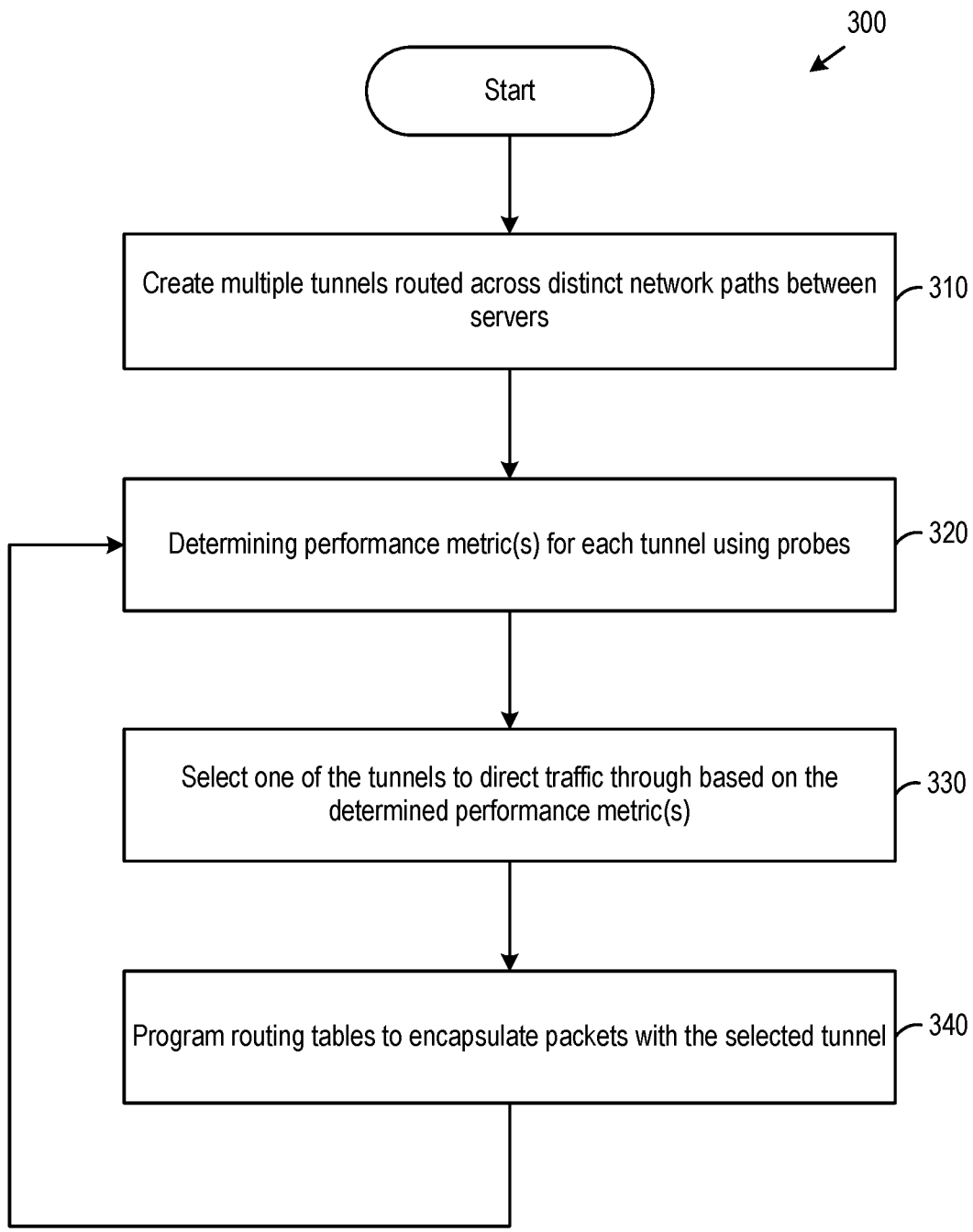
FIG. 3 is a flow diagram depicting a method of avoiding congestion and high latency in a network, according to an embodiment.

FIG. 3 is a flow diagram depicting a method 300 of avoiding congestion and high latency in a network, according to an embodiment. As shown, method 300 begins at step 310, where configuration engine 116 creates multiple tunnels routed across distinct network paths between server 110 and server 120. In one embodiment, the tunnels are IP tunnels such as FOU tunnels with different source ports, and routers which use hashing mechanisms to load balance traffic flows may compute distinct hashes for traffic through each of the tunnels and send such traffic over distinct network paths. As discussed, configuration engine 116 may create such tunnels according to, e.g., configuration information provided by a management application. For example, 64 or 128 FOU tunnels between servers 110 and 120 may be created.

At step 320, link monitor 118 uses probes to determine performance metric(s) for each of the tunnels. The performance metric(s) may include one or more of latency, liveliness, throughput, packet loss, and latency drop, among other things. In one embodiment, link monitor 118 may use a modified owamp technique to measure relative latency and fping to measure liveliness of each of the tunnels. The modified owamp may also be used to authenticate the tunnels. As discussed, the modified owamp may include sending one endpoint's time to the other endpoint for an initial time synchronization and then using the initial time and timing contained in later transmitted packets to determine latency of each of the tunnels, which may then be compared to determine the tunnels' relative latencies. In one embodiment, link monitor 118 creates two sets of schedulers for monitoring the tunnels, one for running the modified owamp to measure one-way latency every one or two minutes, and another for running fping to measure liveliness every one or a few seconds. Such schedulers are triggered periodically and may run multiple probes in parallel. A separate probe scheduler may be created for each local-IP and remote-IP pair to ensure that probes of a slow WAN link are not blocking a faster link, and different schedulers may be used for static FOU tunnels and dynamic FOU tunnels. In addition to the periodic probing, probes may also be sent in response to events such as new network adapters being added or a configuration change, among other things.

At step 330, load balancer 117 selects one of the tunnels to direct traffic through based on the determined performance metric(s). As discussed, at any given point in time, there are multiple tunnels (e.g., FOU tunnels) to the destination, one for each source port, and load balancer 117 is responsible for determining the best tunnel for a given traffic flow. In one embodiment, load balancer 117 receives determined performance metric(s) from link monitor 118 and selects one of the tunnels to use based on those metric(s). The selection algorithm may be as simple as, e.g., selecting one of the tunnels having a lowest latency and through which the other endpoint can be reached, although any feasible algorithm may be used. In one embodiment, load balancer 117 may give additional weighting to tunnel(s) that are currently in use.

After selecting a tunnel at step 330, load balancer 117 programs routing tables to encapsulate packets with the selected tunnel at step 340. For example, load balancer 117 may program the routing tables to implement policy-based routing for IPSec packets going into FOU tunnels. Method 300 then returns to step 320, where link monitor 118 determines additional performance metric(s) for each of the tunnels. That is, the tunnels are continuously monitored for changes and routing may be re-programmed based on the changes.

Advantageously, techniques disclosed herein permit network traffic to be steered away from congestion hot-spots to achieve better throughput and latency in networks, such as the Internet, where the transit path is not controllable by the user. Further, a modified owamp is disclosed that allows relative latency between endpoints to be determined so that traditional clock synchronization is not required for the owamp.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operation system in which at least one application runs. It should be noted that these embodiments may also apply to other examples of contexts, such as containers not including a guest operation system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespace and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and datastores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A computer-implemented method of avoiding congestion and high latency in a network, comprising:

creating a plurality of tunnels routed across distinct network paths between two endpoints, each of the plurality of tunnels having encapsulated packets of one protocol within at least another protocol for transmission, each of the plurality of tunnels being associated with a different corresponding source port, the plurality of tunnels comprising a first tunnel associated with a first source port identifier and a second tunnel associated with a second source port identifier;

encapsulating a first packet with a first encapsulating header, the first encapsulating header comprising the first source port identifier, and encapsulating a second packet with a second encapsulating header, the second encapsulating header comprising the second source port identifier;

based at least in part on the first source port identifier of the first encapsulating header, transmitting the first packet through the first tunnel;

based at least in part on the second source port identifier of the second encapsulating header, transmitting the second packet through the second tunnel;

determining one or more performance metrics for the first and second tunnels; and directing network traffic through one of the first or second tunnels based on the determined one or more performance metrics by including in encapsulating headers of the network traffic one of the first source port identifier or the second source port identifier.

2. The method of claim 1, wherein:

the plurality of tunnels are Foo-over-UDP (FOU) tunnels; and each of the FOU tunnels is a unidirectional Internet Protocol (IP)-in-IP or generic routing encapsulation (GRE) tunnel with a user datagram protocol (UDP) header.

3. The method of claim 1, wherein the one or more performance metrics include one or more of latency, liveliness, throughput, or packet loss.

4. The method of claim 3, wherein the determining the one or more performance metrics includes probing each of the plurality of tunnels.

5. The method of claim 4, wherein the probing includes measuring relative latencies of the plurality of tunnels.

6. The method of claim 3, wherein the one or more performance metrics are determined periodically and/or responsive to events.

7. The method of claim 6, wherein:

a liveliness metric is determined approximately every one or few seconds; and a one-way latency metric is determined approximately every one or two minutes.

8. The method of claim 6, wherein the events include at least one of a new network adapter being added or a configuration change.

9. The method of claim 1, wherein, in the directing network traffic, a tunnel currently in use is given preference over tunnels not currently in use.

10. A non-transitory computer-readable medium comprising instructions executable by a computer, the computer having one or more physical central processing units (CPUs), wherein the instructions, when executed, cause the computer to perform operations for avoiding congestion and high latency in a network, the operations comprising:

creating a plurality of tunnels routed across distinct network paths between two endpoints, each of the plurality of tunnels having encapsulated packets of one protocol within at least another protocol for transmission, each of the plurality of tunnels being associated with a different corresponding source port, the plurality of tunnels comprising a first tunnel associated with a first source port identifier and a second tunnel associated with a second source port identifier;

encapsulating a first packet with a first encapsulating header, the first encapsulating header comprising the first source port identifier, and encapsulating a second packet with a second encapsulating header, the second encapsulating header comprising the second source port identifier;

based at least in part on the first source port identifier of the first encapsulating header, transmitting the first packet through the first tunnel;

based at least in part on the second source port identifier of the second encapsulating header, transmitting the second packet through the second tunnel;

determining one or more performance metrics for the first and second tunnels; and directing network traffic through one of the first and second tunnels based on the determined one or more performance metrics by including in encapsulating headers of the network traffic one of the first source port identifier or the second source port identifier.

11. The computer-readable medium of claim 10, wherein:

the plurality of tunnels are Foo-over-UDP (FOU) tunnels; and each of the FOU tunnels is a unidirectional Internet Protocol (IP)-in-IP or generic routing encapsulation (GRE) tunnel with a user datagram protocol (UDP) header.

12. The computer-readable medium of claim 10, wherein the one or more performance metrics include one or more of latency, liveliness, throughput, or packet loss.

13. The computer-readable medium of claim 12, wherein the determining the one or more performance metrics includes probing each of the plurality of tunnels.

14. The computer-readable medium of claim 13, wherein the probing includes measuring relative latencies of the plurality of tunnels.

15. The computer-readable medium of claim 12, wherein the one or more performance metrics are determined periodically and/or responsive to events.

16. The computer-readable medium of claim 15, wherein the events include at least one of a new network adapter being added or a configuration change.

17. The computer-readable medium of claim 10, wherein, in the directing network traffic, a tunnel currently in use is given preference over tunnels not currently in use.

18. A system, comprising:

a processor; and a memory, wherein the memory includes a program for avoiding congestion and high latency in a network, the program being configured to perform operations comprising:

creating a plurality of tunnels routed across distinct network paths between two endpoints, each of the plurality of tunnels having encapsulated packets of one protocol within at least another protocol for transmission, each of the plurality of tunnels being associated with a different corresponding source port, the plurality of tunnels comprising a first tunnel associated with a first source port identifier and a second tunnel associated with a second source port identifier;

encapsulating a first packet with a first encapsulating header, the first encapsulating header comprising the first source port identifier, and encapsulating a second packet with a second encapsulating header, the second encapsulating header comprising the second source port identifier;

based at least in part on the first source port identifier of the first encapsulating header, transmitting the first packet through the first tunnel;

based at least in part on the second source port identifier of the second encapsulating header, transmitting the second packet through the second tunnel;

determining one or more performance metrics for the first and second tunnels; and directing network traffic through one of the tunnels based on the determined one or more performance metrics by including in encapsulating headers of the network traffic one of the first source port identifier or the second source port identifier.

\* \* \* \* \*